United States Patent [19]
Inaba

[11] Patent Number: 4,925,277

[45] Date of Patent: May 15, 1990

[54] METHOD AND APPARATUS FOR DRIVING OPTICAL MODULATION DEVICE

[75] Inventor: Yutaka Inaba, Kawaguchi, Japan

[73] Assignee: Canon Kabushiki Kaisha, Tokyo, Japan

[21] Appl. No.: 402,996

[22] Filed: Sep. 6, 1989

Related U.S. Application Data

[63] Continuation of Ser. No. 96,931, Sep. 15, 1987, abandoned.

[30] Foreign Application Priority Data

Sep. 17, 1986 [JP] Japan ............................... 61-218998

[51] Int. Cl.[5] ............................................ G02F 1/13

[52] U.S. Cl. ................................ 350/350 S; 350/333; 340/784

[58] Field of Search .................... 350/332, 333, 350 S; 340/765, 784, 805, 811

[56] References Cited

U.S. PATENT DOCUMENTS

| | | | |
|---|---|---|---|
| 4,356,483 | 10/1982 | Fujita et al. | 350/332 |
| 4,367,924 | 1/1983 | Clark et al. | 350/350 S |
| 4,392,131 | 7/1983 | Walter | 340/811 |
| 4,638,310 | 1/1987 | Ayliffe | 340/784 |
| 4,655,561 | 4/1987 | Kanbe et al. | 350/333 |
| 4,709,995 | 12/1987 | Kuribayashi et al. | 350/350 S |
| 4,715,688 | 12/1987 | Harada et al. | 350/350 S |
| 4,728,947 | 3/1988 | Ayliffe et al. | 340/784 |
| 4,770,502 | 9/1988 | Kitazima et al. | 350/350 S |

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

An optical modulation device comprises scanning electrodes and signal electrodes disposed intersecting with each other to form a pixel at each intersection of the scanning electrodes and signal electrodes. The contrast of each pixel is discriminated depending on an electric field applied thereto. The optical modulation device is driven by a method comprising providing the scanning electrodes with at least three potential levels of $V_1$, $V_2$ and $V_3$ which satisfy the relation of $V_1>V_2>V_3$ and providing the signal electrodes with at least three levels of $V_4$, $V_5$ and $V_6$ which satisfy the relation of $V_4>V_5>V_6$; wherein the potentials $V_1$, $V_3$, $V_4$ and $V_6$ are set to satisfy the relation of $V_1-V_3=V_4-V_6$.

8 Claims, 9 Drawing Sheets

METHOD AND APPARATUS FOR DRIVING OPTICAL MODULATION DEVICE

This application is a continuation of application Ser. No. 07/096,931 filed Sep. 15, 1987, now abandoned.

FIELD OF THE INVENTION AND RELATED ART

The present invention relates to a method and an apparatus for driving an optical modulation device of the type wherein a contrast is discriminated depending on an applied electric field, particularly a ferroelectric liquid crystal device having at least two stable states.

A liquid crystal device having bistability has been proposed by Clark and Lagerwall (e.g., Japanese Laid-Open Patent Application No. 56-107216, U.S. Pat. No. 4367924, etc.). In this instance, as the liquid crystals having bistability, ferro-electric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. The characteristics of the liquid crystals of this type are such that they are oriented to either of two stable states at an extremely high speed and the states are maintained when an electric field is not supplied thereto. By utilizing such properties, it is expected that these liquid crystals are widely used in the field of a high-speed and memory-type display apparatus, etc.

When a pair of substrates constituting such a ferroelectric liquid crystal device are respectively provided on their inside surfaces thereof with stripe electrodes so that they intersect with each other to form a matrix display apparatus, driving methods as disclosed in U.S. Pat. No. 4,655,561 and U.S. Pat. application Ser. No. 691,761 can be applied to the apparatus.

FIG. 2 illustrates an exemplary set of driving signal voltage waveforms used in a driving scheme which includes three kinds of periods or phases, i.e., ① a "white"-writing period, ② a selective "black"-writing period, and ③ an auxiliary signal application period, in a selection period on one scanning line. In the period ①, a positive voltage is applied to a scanning line (electrode) and the signal lines (electrodes) are held at 0 volt whereby all the pixels on the scanning line is brought to a first stable state (hereinafter referred to as "white" state). In the period ②, a negative voltage is applied to the scanning line and a positive voltage is selectively applied to signal lines corresponding to pixels (selected pixels) which are desired to be inverted to a second stable state (hereinafter referred to as "black" state), while the signal lines corresponding to the other pixels (half-selected pixels) are supplied with a negative voltage. As a result, the selected pixels are supplied with an inversion voltage (electric field) of a polarity exceeding a threshold and the half-selected pixels are supplied with a voltage of the polarity below the threshold, whereby the selected pixels are written in "black" and the half-selected pixels wherein the "white" state. In the period ③, the signal lines are supplied with voltages of polarities opposite to those respectively applied in the period ②. As a result, it can be obviated that the pixels on the other scanning lines are supplied with a voltage of one and the same polarity for a long period, whereby crosstalk is prevented.

In the above driving embodiment, a voltage applied to a non-selected pixel, i.e., a so-called bias voltage is set to Δ of a driving voltage, and a scanning electrode is supplied with three levels of potentials including $+3V_0$, $-2V_0$ and 0. Thus, the maximum potential variation range is $5V_0$. On the other hand, a signal electrode is supplied with three levels of potentials including 0, $+V_0$ and $-V_0$, and the maximum potential variation range is $2V_0$. The respective electrodes are connected to driving circuit which, is most cases, include analog switches 31 and 32 as shown in FIGS. 3A and 3B. In this case, an analog switch 31 in the scanning electrode driver circuit is required to have a withstand voltage of $5V_0$ at the mininum, whereas an analog switch 32 in the signal electrode driver circuit is only required to have a withstand voltage of $2V_0$. An analog switch with a high withstand voltage is expensive, and a large scale display including a large number of pixels requires a large number of analog switches. This causes an increase in production cost. A similar situation holds true also with a driving circuit other than the one using analog switches.

SUMMARY OF THE INVENTION

Accordingly, an object of the present invention is to provide a method and an apparatus having solved the above problems for driving an optical modulation device, particularly a ferroelectric liquid crystal device of which a contrast is discriminated depending on an applied electric field.

The present invention aims at shifting potential levels of the respective electrodes used in the conventional driving systems to equalizer the withstand voltages required in the scanning side driver circuit and the signal side driver circuit, and at that time, also minimizing the number of output voltage levels to minimize the number of analog switches More specifically, according to the present invention, there is provided a driving method for an optical modulation device comprising scanning electrodes and signal electrodes disposed intersecting with each other to form a pixel at each intersection of the scanning electrodes and signal electrodes, the contrast of a pixel being discriminated depending on an electric field applied thereto; the driving method comprising providing the scanning electrodes with at least three potential levels of $V_1$, $V_2$ and $V_3$ which satisfy the relation of $V_1 > V_2 > V_3$ and providing the signal electrodes with at least three levels of $V_4$, $V_5$ and $V_6$ which satisfy the relation of $V_4 > V_5 > V_6$; the potentials $V_1$, $V_2$, $V_3$, $V_4$, $V_5$ and $V_6$ being set to satisfy the relation of $V_1 - V_3 = V_4 - V_6$ $V_1 - V_3 = V_4 - V_5$ and $V_4 - V_2 \leqq (V_1 - V_3)/2$.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Figure 1:
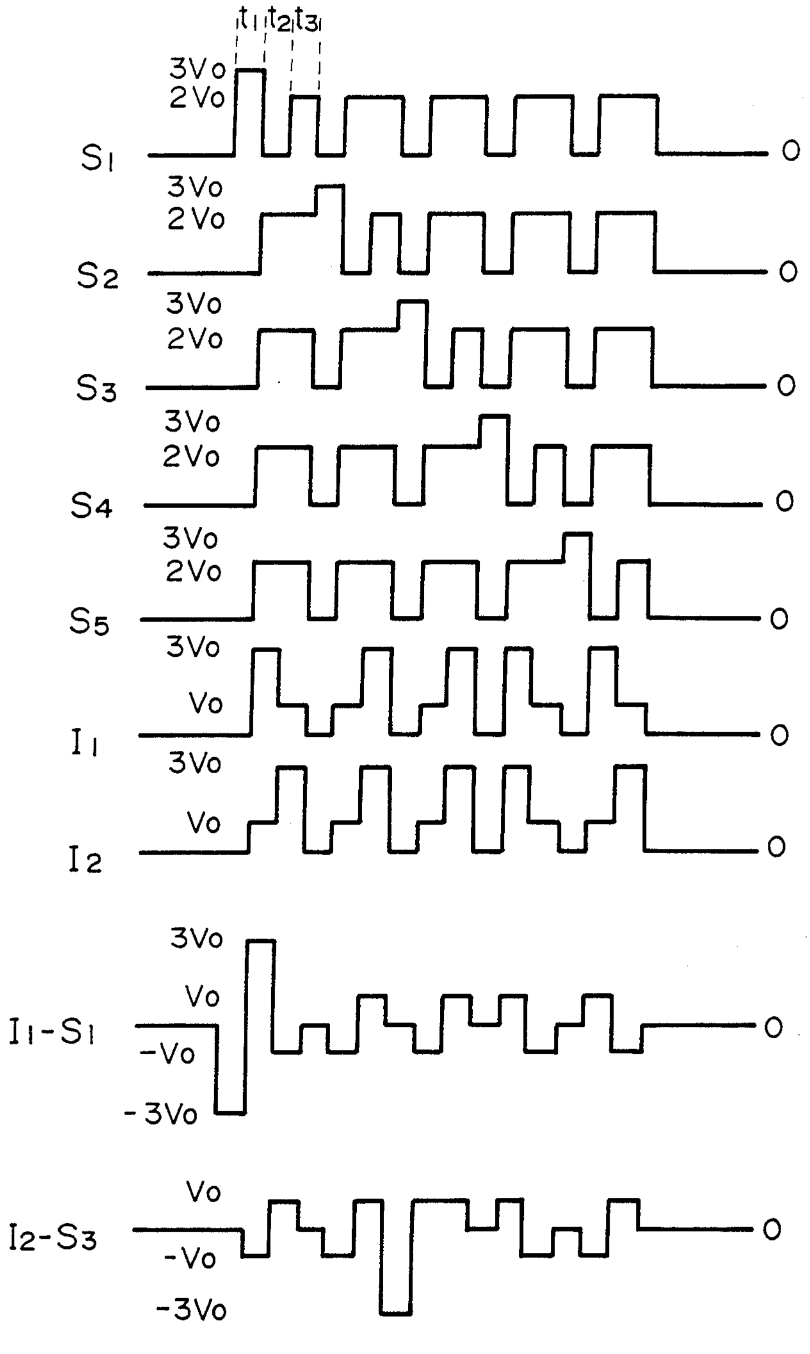
FIG. 1 is a driving waveform diagram illustrating a driving embodiment of the present invention time-serially.
Figure 2:
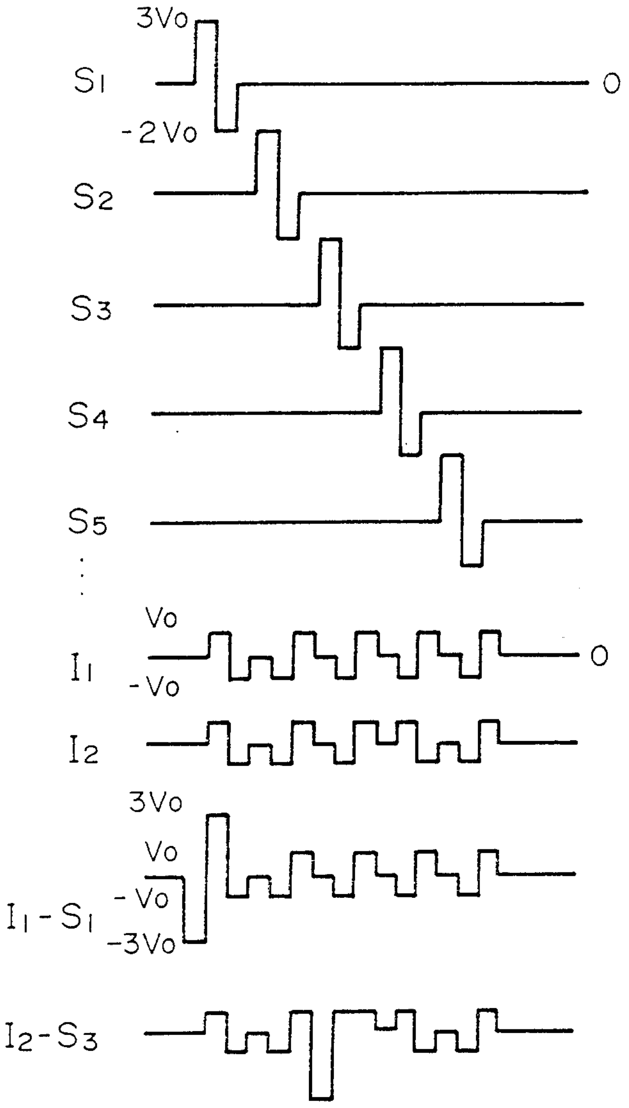
FIG. 2 PRIOR ART
FIG. 2 is a driving waveform diagram illustrating a known driving embodiment time-serially.
Figure 3A:
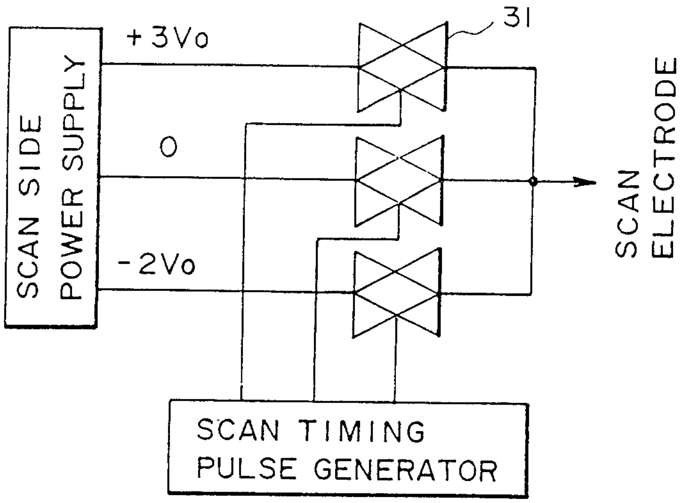
FIG. 3A is a scanning side driver circuit diagram and FIG. 3B is a signal side driver circuit diagram.
Figure 3B:
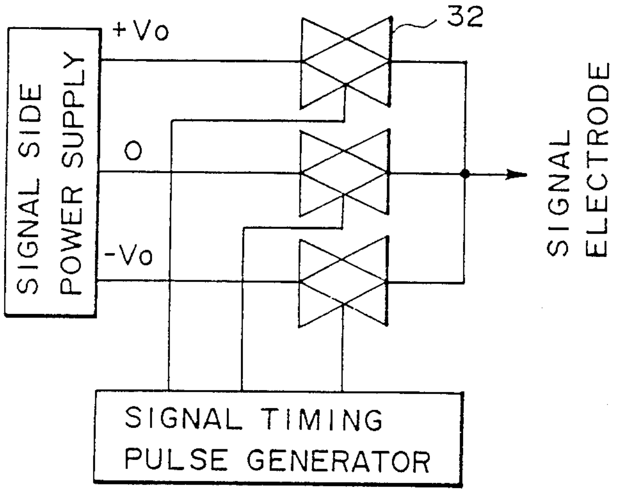
F I G. 3B PRIOR ART

FIG. 1 illustrates an embodiment of the present invention wherein the respective pixels are supplied with the same voltages as explained with reference to FIG. 2, but the voltage levels of the scanning electrodes are three levels of 0, $2V_0$ and $3V_0$ providing a variation range of $3V_0$ and the voltage levels of the signal electrodes are three levels of 0, $V_0$ and $3V_0$ providing a variation range of $3V_0$. As a result, the withstand voltage of a driving circuit is only $3V_0$ both on the scanning side and on the signal side, whereby the withstand voltage on the scanning side can be decreased.

Equalizing the withstand voltages of the scanning side and signal side circuits or minimizing the difference therebetween by level shifting is a conventionally used technique with respect to a liquid crystal device not showing a bistability, e.g., a TN-type liquid crystal device. However, in a device such as a TN-liquid crystal device wherein the degree of optical modulation is determined depending on the RMS (root-mean-square) value of an applied voltage, four voltage levels are required except for a special case. This is explained with reference to FIGS. 4A to 6B.

Figure 4A:
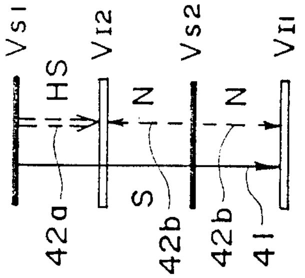
FIG. 4A PRIOR ART
FIGS. 4A, 4B; 5A, 5B and 6A, 6B respectively illustrate potential levels schematically used in conventional TN-liquid crystal driving schemes.
Figure 4B:
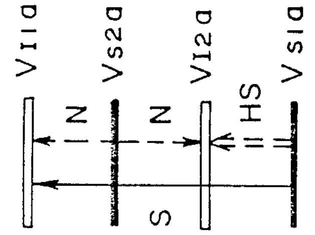
FIG. 4B PRIOR ART

Generally, in driving of a matrix display device, it is required to apply at least two levels of selection and non-selection respectively to scanning electrodes and signal electrodes. In FIG. 4A, voltage levels and voltages applied to pixels therefor are shown. A long arrow 41 represents a voltage applied to a selected pixel (S in the figure=the difference between the potential $V_{S1}$ of a selected scanning electrode and the potential $V_{I1}$ of a selected signal electrode. A dashed arrow 42*a* represents a voltage applied to a half-selected pixel (HS in the figure=the difference between a potential $V_{S1}$ of a selected scanning electrode and a potential $V_{I2}$ of a non-selected signal electrode). A dashed arrow 42*b* represents a voltage applied to a non-selected pixel (N in the figure=the difference between a potential $V_{S2}$ of a nonselected scanning electrode and a potential $V_{I1}$ of a selected signal electrode or a potential $V_{I2}$ of a non-selected scanning electrode). Further, so as not to apply a DC voltage to a pixel, it is necessary to apply voltages as shown in FIG. 4B. The electric fields or voltages applied to the selected, half-selected and non-selected pixels are all in directions opposite to those shown in FIG. 4A. (In many of actual cases, the voltage patterns shown in FIGS. 4A and 4B are alternately applied for each frame period.), wherein $V_{S1a}$ denotes a potential of a selected scanning electrode, $V_{S2a}$ denotes a potential of a non-selected scanning electrode, $V_{I1a}$ denotes a potential of a selected signal electrode, and $V_{I2a}$ denotes a potential of a non-selected signal electrode.

Figure 5A:
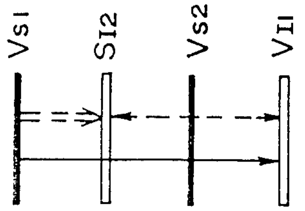
FIG. 5A PRIOR ART
Figure 5B:
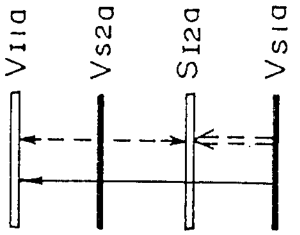
FIG. 5B PRIOR ART

As is apparent from FIGS. 4A and 4B, both the scanning side driver circuit and the signal side driver circuit requires four voltage levels. If a relative voltage relationship as shown in FIGS. 5A and 5B is adopted instead of that shown in FIGS. 4A and 4B, the relation of $V_{S1}=V_{S2a}$ and $V_{S2}=V_{S1a}$ holds so that the number of potential levels of the scanning side driver circuit are decreased to two, whereas the potential variation range $|V_{I1}-V_{I1a}-$ of the signal side driver circuit are broadened. On the other hand, when the number of potential levels for the signal side driver circuit is reduced, the potential variation range for the scanning side driver circuit is broadened.

Figure 6A:
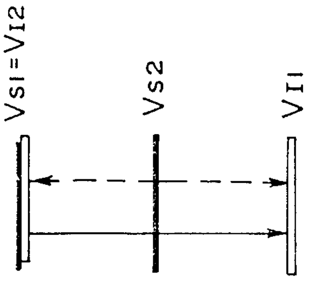
FIG. 6A PRIOR ART
Figure 6B:
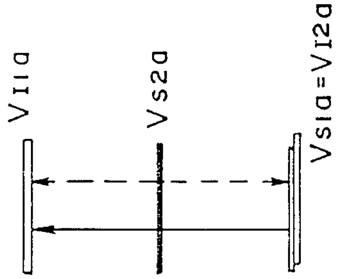
FIG. 6B PRIOR ART

In a special case, it is possible to decrease the number of potential levels. For example, as shown in FIGS. 6A and 6B, if the potential difference between a potential (at the time) of selection and a potential of non-selection in the signal side driver circuit is set to be twice as large as the potential difference between potentials of selection and non-selection, the number of potential levels for the scanning side driver circuit is decreased to three and the number of potential levels for the signal side driver circuit is decreased to two. In this case, however, the ratio of the applied voltage to a selected pixel to the applied voltage to a non-selected pixel is fixed at 2:1, so that only a poor contrast can be attained in a display device having a large number of scanning lines. Thus, this case is not realistic.

Consequently, if the potential variation ranges for the scanning side and signal side driver circuits are intended to be the same in matrix driving of a device not having a bistability, such as a TN-type liquid crystal device, the respective circuits require at least 4 potential levels.

Figure 7A:
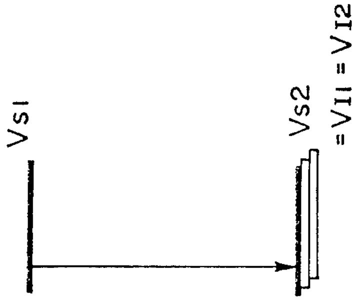
FIGS. 7A, 7B and 7C illustrate potential levels used in a driving scheme according to the present invention.

There is observed a different situation with respect to matrix driving of a display panel wherein a contrast is discriminated depending on the direction of an applied electric field, e.g., a display panel showing bistability. With respect to a display panel showing bistability, FIGS. 4A and 4B represent a selective "white"-writing operation and a selective "black"-writing operation, respectively. Accordingly, if such a driving method is adopted, four voltage levels are necessary for each side of driver circuit except for a special case as a shown in FIG. 6, as has been discussed hereinabove. With respect to a display panel showing bistability, it is not always necessary to effect both of a selective "white"-writing operation and a selective "black"-writing operation, but it is possible to adopt a method wherein the pixels on a scanning line are once simultaneously erased into "white" and then selected pixels on the scanning line are written into "black" as has been explained with reference to FIG. 2. Thus, instead of the operation shown in FIG. 4A, an operation as shown in FIG. 7A may be adopted. More specifically, when all the pixels on a scanning line are simultaneously erased into "white", it is not necessary to apply two levels of selection/non-selection with differentiation, so that it is possible to establish a relationship of $V_{I1}=V_{I2}=V_{S2}$. Then, in a subsequent selective "black" writing period, the same operation as explained with reference to FIG. 4B is conducted as shown in FIG. 7B.

Figure 7B:
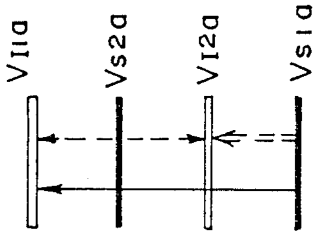

Accordingly, the voltage states shown in FIGS. 7A and 7B are those required at the minimum for a displaying operation for a display panel showing bistability. As is apparent from these figures, when the voltage variation rises are made the same for the scanning side and signal side driving circuits, and the number of the voltage levels is minimized, the number of the voltage levels becomes three for both the scanning side and signal side driver circuits. This has become possible because a driving method wherein the pixels on a scanning line are once erased (written) into "white" simultaneously and then "black" is written selectively has been adopted. This is peculiar to a display panel of which a contrast is discriminated depending on an applied electric field, such as a display panel showing bistability.

Figure 7C:
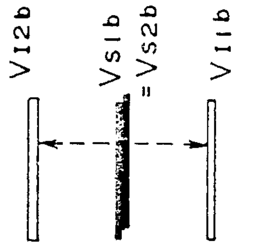

Incidentally, in the driving method explained with reference to FIG. 2, a period for applying an auxiliary signal for preventing occurrence of crosstalk. This can also be realized in the driving method of FIG. 7 by providing a period wherein voltage levels are set as shown in FIG. 7C. Even if the state or period shown in FIG. 7C is added, there occurs no change in potential variation range or number of potential levels involved.

As described above, by providing the states shown in FIGS. 7A–7C, the number of potential levels can be made three both for the scanning side and signal side driving circuits. FIG. 1 illustrates time-serially an embodiment of the driving method according to the present invention in the form of a time-serial combination of the states shown in FIGS. 7A–7C. In FIG. 1, phase $t_1$ corresponds to a step wherein the pixels on a scanning line are simultaneously erased (written) into "white", phase $t_2$ corresponds to a step wherein selected pixels on the scanning line are written into "black", and phase $t_3$ corresponds to a step for applying an auxiliary signal which is applied to convert the voltage applied to non-selected pixels into an alternating voltage.

Figure 8:
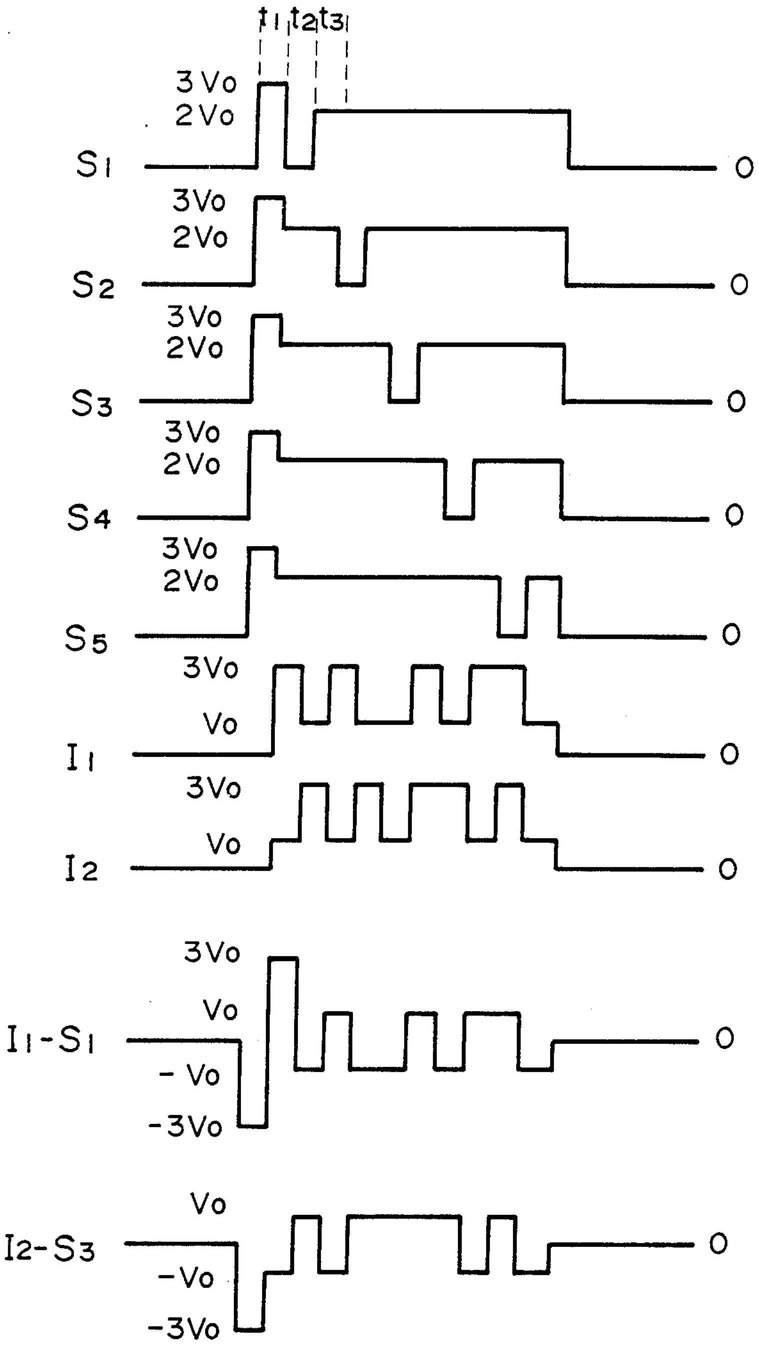
FIG. 8 shows time-serial driving voltage waveforms used at that time.

The above embodiment is one wherein the simultaneous erasure (writing) into "white" and the selective writing into "black" are effected for each scanning line. However, the present invention is also applicable to a driving wherein the pixels on a plurality of scanning lines are simultaneously erased (written) into "white" in a step $t_1$; then in a subsequent step $t_2$, a selective "black" writing operation is effected for each scanning line sequentially; and then in a step $t_3$, an auxiliary signal is applied (Japanese Laid-Open Patent Application No. JP-A 60-156047). It would be readily apparent that the potential levels shown in FIGS. 7A–7C can be adopted as they are. In this case, however, the sequence of application of these levels becomes different from one shown in FIG. 1 and becomes one as shown in FIG. 8.

As has been explained previously, in a special case, the number of potential levels for a signal side driver circuit can be reduced to two. In the case of a device like a TN-type liquid crystal device wherein an optical state is determined depending on an RMS value of an applied voltage, the contrast is remarkably lowered if the voltage ratio for selected/non-selected pixels is set to 2:1. However, the voltage ratio does not influence a contrast with respect to a display panel showing bistability. More specifically, the voltage ratio can be set without difficulty if it is within a range of voltage margin determined by such a factor as fluctuation in threshold voltage for respective pixels constituting a matrix cell.

Figure 9C:
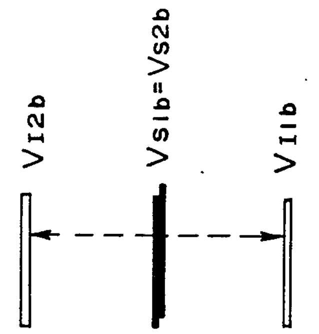
FIGS. 9A, 9B and 9C illustrate potential levels used in another driving scheme according to the present invention.
Figure 9B:
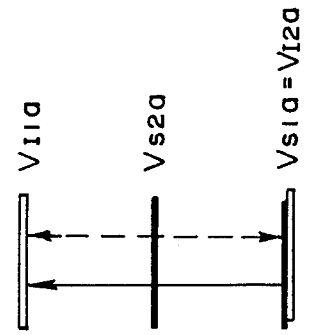
Figure 9A:
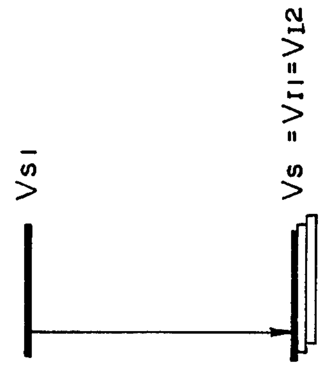
Figure 10:
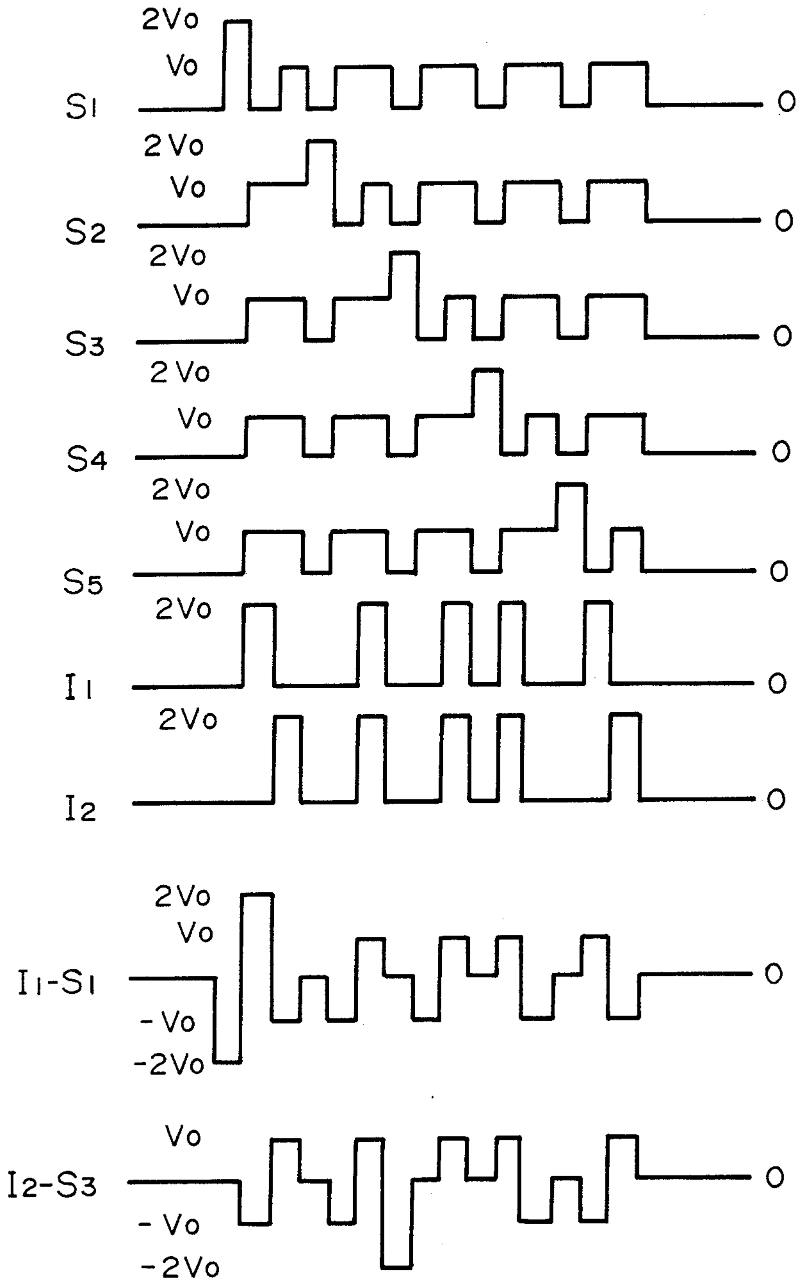
FIG. 10 shows driving voltage waveforms used at that time.

In order to effect a method wherein simultaneous "white" writing is first effected and then selective "black" writing is effected, voltage states as shown in FIGS. 9A–9C are adopted instead of those shown in FIGS. 6A and 6B. This required modification is similar to one adopted in the previous embodiment. FIG. 9C represents voltage levels applied in an auxiliary signal application period. In the auxiliary signal application period, a selected scanning electrode is supplied with a potential level which is the same as a non-selected level, and signal electrodes are supplied with potential levels opposite to those shown in FIG. 9B. FIG. 10 shows a time-serial combination of the states shown in FIGS. 9A–9C.

As described above, by setting the voltage ratio between a selected pixel and a non-selected pixel to 2:1 and adopting a writing scheme of simultaneous "white" writing followed by selective "black" writing, the number of potential levels for the signal side driver circuit can be reduced to two.

Incidentally, in FIG. 7C and FIG. 9C, $V_{S1b}$ denotes the potential of a selected scanning electrode, $V_{S2b}$ denotes the potential of a non-selected scanning electrode, $V_{I1b}$ denotes the potential of a selected signal electrode, and $V_{I2b}$ denotes the potential of a non-selected signal electrode.

Further, in a case where the information signal applied to the signal electrodes has not two levels of "white" and "black" but multi-levels like a gradation signal, the number of additional levels required for the gradational expression may be added to the above-mentioned three levels for the signal side voltage.

The optical modulation material used in an optical modulation device to which the present invention may be suitably applied, may be a material capable of providing a discriminatable contrast by showing at least a first optically stable state and a second optically stable state depending on an electric field applied thereto, preferably a material showing bistability in response to an applied electric field, and particularly a liquid crystal showing such properties.

Preferable liquid crystals having bistability which can be used in the driving method according to the present invention are smectic, particularly chiral smectic, liquid crystals having ferroelectricity. Among them, chiral smectic C phase (SmC*)-, or H (SmH*)-, I (SmI*)-, F (SmF*)- or G (SmG*)-phase liquid crystals are suitable therefor. These ferroelectric liquid crystals are described in, e.g., "LE JOURNAL DE PHYSIQUE LETTRES", 36 (L-69), 1975, "Ferroelectric Liquid Crystals"; "Applied Physics Letters" 36 (11), 1980, "Submicro Second Bistable Electrooptic Switching in Liquid Crystals", "Kotai Butsuri (Solid State Physics)" 16 (141), 1981, "Liquid Crystal", U.S. Pat. Nos. 4561726, 4614609, 4589996, 4592858, 4596667, 4613209, 4615586, 4622165 and 4639089, etc. Ferroelectric liquid crystals disclosed in these publications may be used in the present invention.

More particularly, examples of ferroelectric liquid crystal compound used in the method according to the present invention are decyloxybenzylidene-p′-amino-2-methylbutyl-cinnamate (DOBAMBC), hexyloxy-benzylidene-p′-amino-2-chloropropylcinnamate (HOBACPC), 4-0-(2-methyl)-butylresorcylidene-4′-octylaniline (MBRA8), etc.

When a device is constituted by using these materials, the device may be supported with a block of copper, etc., in which a heater is embedded in order to realize a temperature condition where the liquid crystal compounds assume an SmC*-, SmH*-, SmI*-, SmF*-or SmG*-phase.

Figure 11:
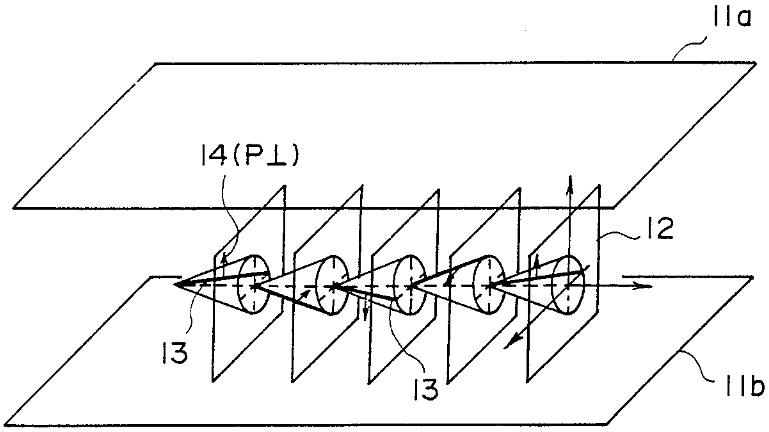
FIGS. 11 and 12 are schematic perspective views illustrating a ferroelectric liquid crystal device used in the present invention.
Figure 12:
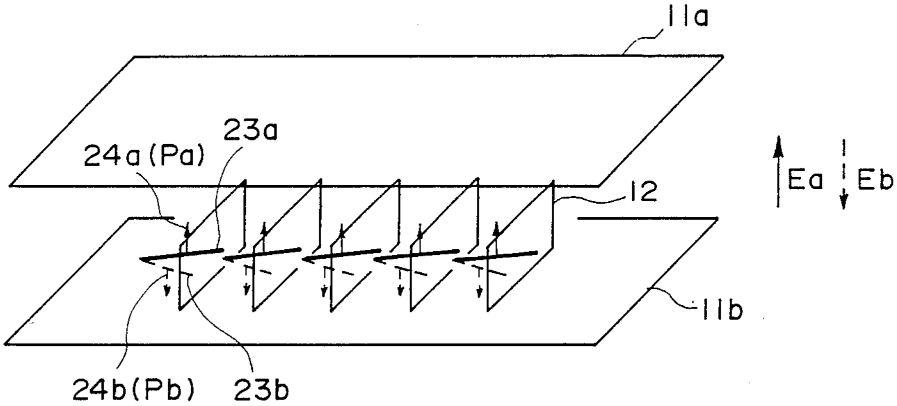

Referring to FIG. 11, there is schematically shown an example, of a ferroelectric liquid crystal cell. Reference numerals 11*a* and 11*b* denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 12 are oriented perpendicular to surfaces of the glass plates is hermetically disposed therebetween. A full line 13 shows a liquid crystal molecule. Each liquid crystal molecule 13 has a dipole moment (P⊥) 12 in a direction perpendicular to the axis thereof. When a voltage higher than a certain threshold level is applied between electrodes formed on the substrates 11*a* and 11*b*, a helical structure of the liquid crystal molecule 13 is unwound or released to change the alignment direction of respective liquid crystal molecules 13 so that the dipole moment (P⊥) 14 are all directed in the direction of the electric field. The liquid crystal molecules 133 have an elongated shape and show refractive anisotropy between the long axis and the short axis thereof. Accordingly, it is easily understood that when, for instance, polarizers arranged in a cross nicol relationship, i.e., with their polarizing directions being crossing each other are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1 micron), the helical structure of the liquid crystal molecules is unwound without application of an electric field whereby the dipole moment assumes either of the two states, i.e., Pa in an upper direction 24*a* or Pb in a lower direction 24*b* as shown in FIG. 12. When electric field Ea or Eb higher than a certain threshold level and different from each other in polarity as shown in FIG. 12 is applied to a cell having the above-mentioned characteristics, the dipole moment is directed either in the upper direction 24*a* or in the lower direction 24*b* depending on the vector of the electric field Ea or Eb. In correspondence with this, the liquid crystal molecules are oriented in either of a first stable state 23*a* and a second stable state 23*b*.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 12. When the electric field Ea is applied to the liquid crystal molecules, they are oriented to the first stable state 23*a*. This state is stably retained even if the electric field is removed. On the other hand, when the electric field Eb of which direction is opposite to that of the electric field Ea is applied thereto, the liquid crystal molecules are oriented to the second stable state 23*b*, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, particularly 1 to 5 microns.

As described hereinabove, according to the present invention, the production and operation costs of driving circuits can be decreased in a matrix driving system for a display panel of which a contrast is dicriminated depending on the direction of an applied electric field, such as an optical modulation device showing bistability, by equalizing the variation ranges of the scanning electrode potential and the signal electrode potential and by minimizing the number of potential levels for the respective electrodes. The number of potential levels may generally be three for the scanning side driving circuit and three for the signal side driving circuit at the minimum, but can be decreased to two for the signal side driving circuit when the ratio of voltages applied to a selected pixel and a non-selected pixel is set to 2:1.

What is claimed is:

1. A driving method for an optical modulation device comprising scanning electrodes and signal electrodes disposed intersecting with each other to form pixels having a ferroelectric liquid crystal thereinbetween, the driving method comprising:

providing the scanning electrodes with three potential levels, $V_1$, $V_2$, and $V_3$, which satisfy the relation $V_1 > V_2 > V_3$;

providing the signal electrodes with two potential levels, $V_4$ and $V_5$, and satisfy the relation $V_4 > V_5$, wherein the potentials $V_1$, $V_2$, $V_3$, $V_4$ and $V_5$ are set to satisfy the relations $V_1 - V_3 = V_4 - V_5$, and $V_4 - V_2 = (V_1 - V_3)/2$;

simultaneously bringing all the pixels on one of the scanning electrodes to a first stable state; and converting only selected pixels on the one scanning electrode to a second stable state, wherein the potential level $V_4$ is provided after the potential level $V_1$, and in synchronism with the potential level $V_3$ to signal electrodes corresponding to the selected pixels on the one scanning electrode, and wherein the potential level $V_5$ is provided after the potential level $V_1$, and in synchronism with the potential level $V_3$ to signal electrodes corresponding to the non-selected pixels on the one scanning electrode.

2. A method according to claim 1, comprises a step wherein all the pixels on at least scanning electrode are brought to a first state, a step wherein only selected pixels on said at least one scanning electrode are converted to a second stable state, and a step wherein an auxiliary signal is applied to the pixels on said at least one scanning electrode.

3. A method according to claim 1, wherein said ferroelectric liquid crystal device shows bistability.

4. A method according to claim 1, wherein said ferroelectric liquid crystal device comprises a chiral smectic liquid crystal.

5. A driving method for an optical modulation device comprising scanning electrodes and signal electrodes disposed intersecting with each other to form pixels having a ferroelectric liquid crystal thereinbetween, the driving method comprising:

providing the scanning electrodes with three potential levels, $V_1$, $V_2$ and $V_3$, which satisfy the relation $V_1 > V_2 > V_3$;

providing the signal electrodes with potential levels, $V_4$, $V_5$ and $V_6$, which satisfy the relation $V_4 > V_5 > V_6$, wherein the potentials $V_1$, $V_2$, $V_3$, $V_4$ and $V_6$ are set to satisfy the relation $V_1 - V_3 = V_4 - V_6$ and $V_4 - V_2 < (V_1 - V_3)/2$;

simultaneously bringing all the pixels on one of the scanning electrodes to a first stable state in one vertical scanning period; and converting only selected pixels on the one scanning electrode to a second stable state, wherein the potential level $V_6$ is provided in synchronism with the potential level $V_1$ and the potential level $V_4$ is provided after the potential level $V_1$, and in synchronism with the potential level $V_3$ to signal electrodes corresponding to the selected pixels on the one scanning electrode, and wherein the potential level $V_6$ is provided in synchronism with the potential level $V_1$ and the potential level $V_5$ is provided after the potential level $V_1$, and in synchronism with the potential level $V_3$ to signal electrodes corresponding to the non-selected pixels on the one scanning electrode.

6. A method according to claim 5, further comprising the step of bringing all the pixels on at least one of the scanning electrodes to a first state, the step of converting only selected pixels on at least one of the scanning electrodes to a second stable state, and the step of applying an auxiliary signal to the pixels on at least one of the scanning electrodes.

7. A method according to claim 5, wherein said pixel comprises a ferroelectric liquid crystal showing bistability.

8. A method according to claim 5, wherein said ferroelectric liquid crystal comprise a chiral smectic liquid crystal.

* * * * *